United States Patent
Choi et al.

(10) Patent No.: US 12,495,054 B2
(45) Date of Patent: Dec. 9, 2025

(54) METHOD FOR TRAINING ATTACK PREDICTION MODEL AND DEVICE THEREFOR

(71) Applicant: AGENCY FOR DEFENSE DEVELOPMENT, Daejeon (KR)

(72) Inventors: Chang Hee Choi, Daejeon (KR); Chan Ho Shin, Daejeon (KR); Sung Uk Shin, Daejeon (KR); Seong Yun Seo, Daejeon (KR); In Seop Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 263 days.

(21) Appl. No.: 18/126,005

(22) Filed: Mar. 24, 2023

(65) Prior Publication Data

US 2023/0308462 A1 Sep. 28, 2023

(30) Foreign Application Priority Data

Mar. 25, 2022 (KR) .......................... 10-2022-0037634

(51) Int. Cl.
*H04L 9/40* (2022.01)
(52) U.S. Cl.
CPC ........ *H04L 63/1425* (2013.01); *H04L 63/205* (2013.01)
(58) Field of Classification Search
CPC ............... G06N 20/00; G06N 5/00; H04L 63/14–63/1433; H04L 63/20; H04L 63/205
See application file for complete search history.

(56) References Cited

U.S. PATENT DOCUMENTS

| | | | |
|---|---|---|---|
| 11,258,825 B1* | 2/2022 | Yang | H04L 63/20 |
| 2022/0046048 A1* | 2/2022 | Koo | H04L 63/1433 |
| 2022/0053019 A1 | 2/2022 | Lantuh et al. | |
| 2023/0016670 A1* | 1/2023 | Kubota | G06F 21/554 |
| 2023/0038196 A1* | 2/2023 | Labreche | G06F 21/577 |

(Continued)

FOREIGN PATENT DOCUMENTS

| | | | |
|---|---|---|---|
| JP | 2021174276 A | 11/2021 | |
| KR | 10-2354094 B1 | 1/2022 | |

(Continued)

OTHER PUBLICATIONS

Xun Su, et al, "Training Method of Attack Information Prediction Model, Device, Electronic Device and Storage Medium", Dec. 25, 2020, CN 202011060894 A (Fit English Translation), pp. 1-49 (Year: 2020).*

(Continued)

*Primary Examiner* — Jonathan A Bui
(74) *Attorney, Agent, or Firm* — MILES & STOCKBRIDGE P.C.

(57) ABSTRACT

Provided is a method for training an attack prediction model, including obtaining an attack dataset including at least one attack datum, analyzing the attack dataset based on tactics and techniques, generating a sequence for the at least one attack datum based on the analysis, and training the attack prediction model based on the sequence, and provided is a device for training the digital attack prediction model.

13 Claims, 7 Drawing Sheets

(56) References Cited

U.S. PATENT DOCUMENTS

| | | | |
|---|---|---|---|
| 2023/0141928 A1* | 5/2023 | Sterba | G06N 20/20 |
| | | | 726/22 |
| 2023/0208866 A1* | 6/2023 | Chung | H04L 63/1425 |
| | | | 726/23 |
| 2024/0232343 A1* | 7/2024 | Tang | G06F 21/56 |

FOREIGN PATENT DOCUMENTS

| | | |
|---|---|---|
| KR | 102362516 B1 | 2/2022 |
| WO | 2021078566 A1 | 4/2021 |

OTHER PUBLICATIONS

YunA Hur et al., "A Study on Automatic Detection and Extraction of Unstructured Security Threat Information using Deep Learning," Korea University, Computer Science and Engineering (2018), pp. 584-586, published Oct. 12, 2018.

Nam-Uk Kim et al., "A Study on Mechanism of Intelligent Cyber Attack Path Analysis," https://doi.org/10.33778/kcsa.2021.21.1.093, published Mar. 22, 2018.

Office Action issued Jan. 23, 2024 in corresponding Korean Application No. 10-2022-0037634.

* cited by examiner

FIG. 2

| TA0003 | TA0005 | TA0007 | TA0009 | TA0009 | TA0009 | TA0009 | TA0009 | TA0009 | TA0010 |
|--------|--------|--------|--------|--------|--------|--------|--------|--------|--------|
| T1060  | T1112  | T1083  | T1113  | T1025  | T1119  | T1005  | T1074  | T1056  | T1020  |

METHOD FOR TRAINING ATTACK PREDICTION MODEL AND DEVICE THEREFOR

PRIORITY INFORMATION

This application claims the benefit of Korean Patent Application No. 10-2022-0037634, filed on Mar. 25, 2022, in the Korean Intellectual Property Office, the disclosure of which is incorporated herein by reference in its entirety.

FIELD OF THE INVENTION

The example embodiments relate to systems, devices, methods, and instructions for training an attack prediction model. In particular, the example embodiments generate a sequence by analyzing attack data based on tactics and techniques, and train an attack prediction model based on the generated sequence in order to predict the next behavior of a cyberattack.

DISCUSSION OF THE RELATED ART

With the development of communication techniques, the subjects of cyberattacks are becoming increasingly sophisticated. Accordingly, the targets of cyberattacks are changing from individuals to groups, and the composition of attacks also is systematically and continuously evolving.

Meanwhile, for organizations with sufficient human resources and capital, it is easy to evade signature-based defense techniques that have defended against individual-level attacks. Various studies have been conducted to counter these attacks, and one of them is to model cyberattacks as tactics, techniques and procedures (TTP). With regard thereto, the most famous modeling technique is MITRE ATT&CK, created by the non-profit organization MITRE.

MITRE ATT&CK is a model that can represent cyberattacks as Matrices, Tactics, Techniques, Migrations, Groups and Software items, and currently, many cyber security companies are developing techniques using MITRE ATT&CK. However, techniques of predicting the next attack by a cyber-attacker is still incomplete.

SUMMARY OF THE INVENTION

An aspect provides a frame work for defending high-level Advanced Persistent Threat (APT) attacks by predicting the next action during an attack.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an aspect, there is provided a method for training an attack prediction model, including obtaining an attack dataset including at least one attack datum, analyzing the attack dataset based on tactics and techniques, generating a sequence for the at least one attack datum based on the analysis, and training the attack prediction model based on the sequence.

According to another aspect, there is provided device for training an attack prediction model, including a memory configured to store an attack dataset including at least one attack datum and a processor, which is configured to obtain an attack dataset including at least one attack datum, analyze the attack dataset based on tactics and techniques, generate a sequence for the at least one attack datum based on the analysis, and train the attack prediction model based on the sequence.

According to another aspect, there is provided a computer-readable non-transitory recording medium having a program for executing a method for training an attack prediction model on a computer, wherein the method for training an attack prediction model includes obtaining an attack dataset including at least one attack datum, analyzing the attack dataset based on tactics and techniques, generating a sequence for the at least one attack datum based on the analysis, and training the attack prediction model based on the sequence.

Additional aspects of example embodiments will be set forth in part in the description which follows and, in part, will be apparent from the description, or may be learned by practice of the disclosure.

According to example embodiments, it is possible to respond to ever-changing high-level APT attacks by predicting the next action during an attack, rather than by searching for (e.g., threat hunting) and preventing a vulnerability before an attack.

The effect of the example embodiments are not limited to the above-described effects, and other effects not described would be clearly understood by those skilled in the art from the description of the claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a schematic diagram of a sequence generation method according to an example embodiment.

DETAILED DESCRIPTION OF THE INVENTION

Figure 1:
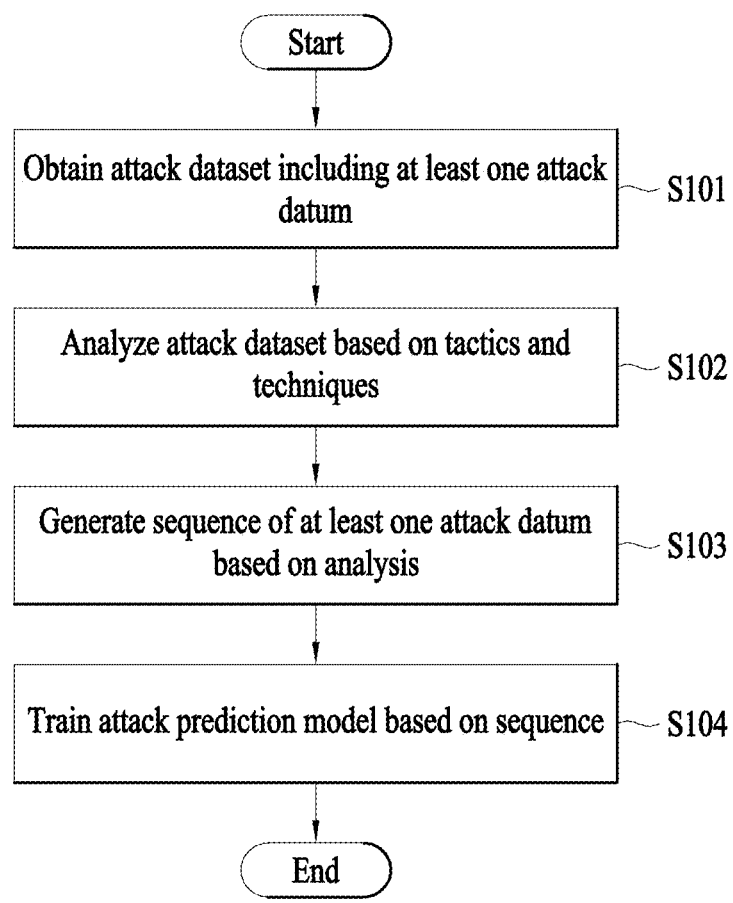
FIG. 1 is a flowchart illustrating a method for training an attack prediction model according to an example embodiment.

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Expression "at least one of a, b and c" described throughout the specification may include "a alone," "b alone," "c alone," "a and b," "a and c," "b and c" or "all of a, b and c."

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein. Hereinafter, example embodiments of the present disclosure will be described in detail with reference to the drawings.

The example embodiments relate to a method of predicting the next attack behavior of cyber users based on a dataset based on a model that is modeling cyberattacks with items such as matrix, tactic and technique. In the example embodiments, general PCs and servers are targeted, and ATT&CK Matrix for Enterprise of MITRE may be used. ATT&CK Matrix for Enterprise can model cyberattacks with about 14 tactics, such as Reconnaissance and Privilege Escalation, and about 215 techniques, such as Active Scanning and Phishing. The number of tactics and techniques may vary depending on the dataset.

The full picture of a cyberattack may usually be seen in a report issued by a security company. Cyberattack reports describe the various techniques used in attacks. Valentine Legoy, which is a research team, conducted a study to extract MITRE ATT&CK techniques from reports, created a dataset for the experiment, and published the dataset on GitHub. With example embodiments of the present disclosure, a dataset to predict a user's next attack behavior may be obtained, with the consideration of the dataset of Valentine Legoy.

For example, MITRE ATT&CK includes, as tactics, Reconnaissance, Resource Development, Initial Access, Execution, Persistence, Privilege Escalation, Defense Evasion, Credential Access, Discovery, Lateral Movement, Collection, Command and Control, Exfiltration and Impact. According to an example embodiment, the tactics may proceed in the above order, and vice versa. Further, since tactics Reconnaissance and Resource Development are difficult to be detected, an attack may be detected except for the two tactics.

Reconnaissance, which is one of the tactics, includes 10 techniques, which are Active Scanning, Gather Victim Host Information, Gather Victim Identity Information, Gather Victim Network Information, Gather Victim Org Information, Phishing for Information, Search Closed Sources, Search Open Technical Databases, Search Open Websites/Domains and Search Victim-Owned Websites. Resource Development, one of the tactics, includes seven techniques, which are Acquire Infrastructure, Compromise Accounts, Compromise Infrastructure, Develop Capabilities, Establish Accounts, Obtain Capabilities and Stage Capabilities. Initial Access, which is one of the tactics, includes nine techniques, which are Drive-by Compromise, Exploit Public-Facing Application, External Remote Services, Hardware Additions, Phishing, Replication Through Removable Media, Supply Chain Compromise, Trusted Relationship and Valid Accounts. Execution, one of the tactics, includes 12 techniques, which are Command and Scripting Interpreter, Container Administration Command, Deploy Container, Exploitation for Client Execution, Inter-Process Communication, Native API, Scheduled Task/Job, Shared Modules, Software Deployment Tools, System Services, User Execution and Windows Management Instrumentation. Persistence, one of the tactics, includes 19 techniques, including Account Manipulation, BITS Jobs, Boot or Logon Autostart Execution, Boot or Logon Initialization Scripts, Browser Extensions, Compromise Client Software Binary, Create Account, Create or Modify System Process, Event Triggered Execution, External Remote Services, Hijack Execution Flow, Implant Internal Image, Modify Authentication Process, Office Application Startup, Pre-OS Boot, Scheduled Task/Job, Server Software Component and Traffic Signaling. Privilege Escalation, one of the tactics, includes 13 techniques, which are Abuse Elevation Control Mechanism, Access Token Manipulation, Boot or Logon Autostart Execution, Boot or Logon Initialization Scripts, Create or Modify System Process, Domain Policy Modification, Escape to Host, Event Triggered Execution, Exploitation for Privilege Escalation, Hijack Execution Flow, Process Injection, Scheduled Task/Job and Valid Accounts. Defense Evasion, one of the tactics, includes 39 techniques, including Abuse Elevation Control Mechanism, Access Token Manipulation, BITS Jobs, Build Image on Host, Deobfuscate/Decode Files or Information, Deploy Container, Direct Volume Access, Domain Policy Modification, Execution Guardrails, Exploitation for Defense Evasion, File and Directory Permissions Modification, Hide Artifacts, Hijack Execution Flow, Impair Defenses, Indicator Removal on Host, Indirect Command Execution, Masquerading, Modify Authentication Process, Modify Cloud Compute Infrastructure, Modify Registry and Modify System Image. Credential Access, one of the tactics, includes 15 techniques, which are Brute Force, Credential from Password Stores, Exploitation for Credential Access, Forced Authentication, Forge Web Credentials, Input Capture, Main-in-the-Middle, Modify Authentication Process, Network Sniffing, OS Credential Dumping, Steal Application Access Token, Steal or Forge Kerberos Tickets, Steal Web Session Cookie, Tow-Factor Authentication Interception and Unsecured Credentials. Discovery, one of the tactics, includes 27 techniques, including Account Discovery, Application Window Discovery, Browser Bookmark Discovery, Cloud Infrastructure Discovery, Cloud Service Dashboard, Cloud Service Discovery, Container and Resource Discovery, Domain Trust Discovery, File and Directory Discovery, Network Service Scanning, Network Share Discovery, Network Sniffing, Password Policy Discovery, Peripheral Device Discovery, Permission Groups Discovery, Query Registry, Remote System Discovery, Software Discovery, System Information Discovery, System Location Discovery and System Network Configuration Discovery. Lateral Movement, one of the tactics, includes nine techniques, which are Exploitation of Remote Services, Internal Spearphishing, Lateral Tool Transfer, Remote Service Session Hijacking, Remote Services, Replication Through Removable Media, Software Deployment Tools, Taint Shared Content and Use Alternate Authentication Material. Collection, one of the tactics, includes 17 techniques, which are Archive Collected Data, Audio Capture, Automated Collection, Clipboard Data, Data from Cloud Storage Object, Data from Configuration Repository, Data from Information Repositories, Data from Local System, Data from Network Shared Drive, Data from Removable Media, Data Staged, Email Collection, Input Capture, Man in the Browser, Man-in-the-Middle, Screen Capture and Video Capture. Command and Control, one of the tactics, includes 16 techniques, which are Application Layer Protocol, Communication Through Removable Media, Data Encoding, Data Obfuscation, Dynamic Resolution, Encrypted Channel, Fallback Channels, Ingress Tool Transfer, Multi-Stage Channels, Non-Application Layer Protocol, Non-Standard Port, Protocol Tunneling, Proxy, Remote Access Software, Traffic Signaling and Web Service. Exfiltration, one of the tactics, includes nine techniques, which are Automated Exfiltration, Data Transfer Size Limits, Exfiltration Over Alternative Protocol, Exfiltration Over C2 Channel, Exfiltration Over Other Network Medium, Exfiltration Over Physical Medium, Exfiltration Over Web Service, Scheduled Transfer and Transfer Data to Cloud Account. Impact, one of the tactics, includes 13 techniques, which are Account Access Removal, Data Destruction, Data Encrypted for Impact, Data Manipulation, Defacement, Disk Wipe, Endpoint Denial of Service, Firmware Corruption, Inhibit System Recovery, Network Denial of Service, Resource Hijacking, Service Stop and System Shutdown/Reboot.

FIG. 1 is a flowchart illustrating a method for training an attack prediction model according to an example embodiment.

In operation S101, an attack dataset including at least one attack datum may be obtained. According to the example embodiment, the attack dataset is data obtained by one-hot encoding of cyberattacks based on the tactics and the techniques to be described later. Each of the at least one attack datum may include a datum corresponding to any one of the tactics and the techniques.

In operation S102, the attack dataset may be analyzed based on the tactics and the techniques. According to the example embodiment, a tactic may be one of the process of a cyberattack, and a technique may be a technique for performing a corresponding tactic. A technique may be a concept involved in achieving a tactic, but exceptionally, there may be techniques that can be performed independently of tactics.

Table 1 shows part of the dataset expressing the tactics and the techniques corresponding to each cyberattack.

TABLE 1

| Text | TA0003 | TA0004 | ... | T1124 | T1035 | T1216 |
|---|---|---|---|---|---|---|
| Talos Blog ǁ Cisco ... | 1 | 1 | ... | 1 | 0 | 0 |
| OilRig Actors Provide ... | 0 | 0 | ... | 0 | 0 | 0 |
| Hogfish Redleaves ... | 1 | 0 | ... | 0 | 0 | 0 |

An attack dataset used to generate a sequence for training (e.g., configuring) an attack prediction model according to an example embodiment of the present disclosure includes a dataset in which tactics and techniques corresponding to each cyberattack are expressed by one-hot encoding. The dataset is characterized by the absence of temporal order. In Table 1, the text column represents an attack report, and it is assumed that one attack is recorded in one report. In the column, the prefix "TA" indicates a tactic, and "T" indicates a technique. Further, 0 indicates "does not apply" and 1 indicates "apply." In Table 1, there are about 1000 columns and about 280 rows, and 14 or more tactics and 215 or more techniques may be included.

In operation S103, based on the analysis, a sequence of at least one attack datum may be generated. According to the example embodiment, a tactic may be allocated to a technique, and at least one attack datum may be sorted based on the order of the tactics. Further, based on the sorted attack data, a sequence for the techniques may be generated. Here, at least one attack datum may be sorted based on the order of the tactics using a sorting algorithm. With regard thereto, a detailed description will be made with reference to FIG. 2 to be described later.

In operation S104, an attack prediction model can be trained based on the sequence. According to the example embodiment, by constituting training (e.g., configuring) data that includes from a first technique of the sequence to a technique that is second to the last technique in the sequence, and by constituting a training label that includes from the second technique from the beginning of the sequence to the last technique, the attack prediction model may be trained by pairing each of the training data and training label. According to an example embodiment, an attack prediction model may be "learned" or "trained," and in both cases, it indicates that the model of the present disclosure has a predicting function that outputs a next attack technique based on the training data. According to an example embodiment, the attack prediction model may include a long short term memory (LSTM) and a linear layer, and here, the LSTM may be designed to be bidirectional. In this regard, a detailed description will be made with reference to FIGS. 3 and 4 to be described later.

FIG. 2 is a schematic diagram of a sequence generation method according to an example embodiment.

The present disclosure relates to a preparation for defense in advance by predicting the next technique of a cyberattacker. For this, the data in Table 1 may be converted. In Table 1, one attack report may be regarded as one attack dataset.

First, based on a matrix that classifies cyberattacks based on tactics and techniques, the tactics may be allocated as keys for each technique. According to the example embodiment, the matrix may be based on MITRE ATT&CK described above. Then, at least one attack datum included in the attack dataset may be sorted based on tactic. Here, a sorting algorithm may be used. In general, the order of the tactics is based on a logical cause-and-effect relationship, and the order naturally has a high probability of matching the order of physical attacks. Then, from the sorted attack data, the context of the technique may be identified, and the context of the techniques may be made into a sequence.

Referring to FIG. 2, the tactics include TA0003, TA0005, TA0007, TA0009 and TA0010, and each tactic is listed in order based on the matrix. Since tactics are allocated as keys for each technique, each tactic has a labeled technique, and as the tactics are listed in order, corresponding techniques may also be listed. Accordingly, in FIG. 2, the techniques are listed in the order of T1060, T1112, T1083, T1113, T1025, T1119, T1005, T1074, T1056 and T1020.

Meanwhile, if multiple identical tactics are identified in one attack dataset, the order of corresponding techniques may not be considered. Alternatively, for the same tactic, attack data may be arbitrarily listed in the order in which the techniques are labeled to the tactics in the attack report.

Table 2 shows some of sequences generated according to the example embodiment of the present disclosure. The "Cyberattack" column in Table 2 shows the numbers of attack reports, and the cyberattack column has the same meaning as the text column in Table 1. According to the example embodiment, among the generated sequences, if there are 2 or less attack techniques, the sequence may be excluded from the training data.

TABLE 2

| Cyberattack | Sequence |
|---|---|
| 45 | T1193→T1105→T1113→T1125 |
| 51 | T1168→T1116→T1113→T1123 |
| 86 | T1033→T1082→T1016→T1048 |

By generating a sequence based on the attack dataset, training data may be built to train (e.g., configure) the attack prediction model. In this case, except for the last technique in the sequence, the training data x may be from the first technique to the technique that is second to the last technique from the back. Further, except for the first technique of the sequence, the training label y may be from the second technique to the last technique. Constituting x and y in this way is because the last technique is not suitable as training data because there is no subsequent technique, and because the first label is not needed because the model of the present disclosure is to predict a subsequent technique. For example, referring to FIG. 2, in the case of cyberattack 45, training data x may be T1193, T1105 and T1113, and training label y may be T1105, T1113 and T1125. According to an example embodiment, training data x and training label y may be input to the attack prediction model as a pair of (x, y), respectively.

Figure 3:
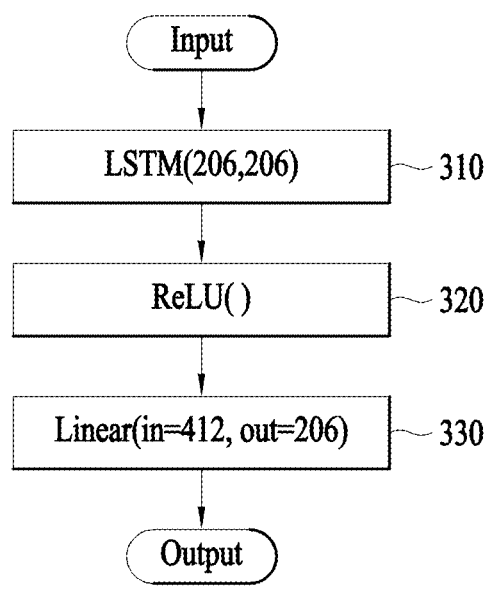
FIG. 3 is a flowchart illustrating an attack prediction model according to an example embodiment.

FIG. 3 is a flowchart illustrating an attack prediction model according to an example embodiment.

The attack prediction model of the present disclosure may use a LSTM 310 to efficiently learn small data. In FIG. 3, the number of dimensions or the number of labels of one-hot encoding is configured to be 206 as the input value of the LSTM. When each technique included in the sequence passes through the LSTM, data may be organized using a linear layer 330 after passing through an activation function 320. For example, data may be organized so that it may be input to the linear layer 330 using a rectified linear unit (ReLU) function 320, and the precedence relationship between techniques may be output through the linear layer 330.

According to an example embodiment, in the case of the tactics, the order described in an attack report may be followed, but it cannot be ruled out that the attack is performed in the reverse order, and thus by constituting the LSTM 310 in duplicate, both forward and backward directions may be trained. Since the sequence for training is used bi-directionally, the input data that is input to the linear layer 330 may be 412, which is twice the input data of the LSTM 310. Further, the data may be reduced by half through the linear layer 330.

Figure 4:
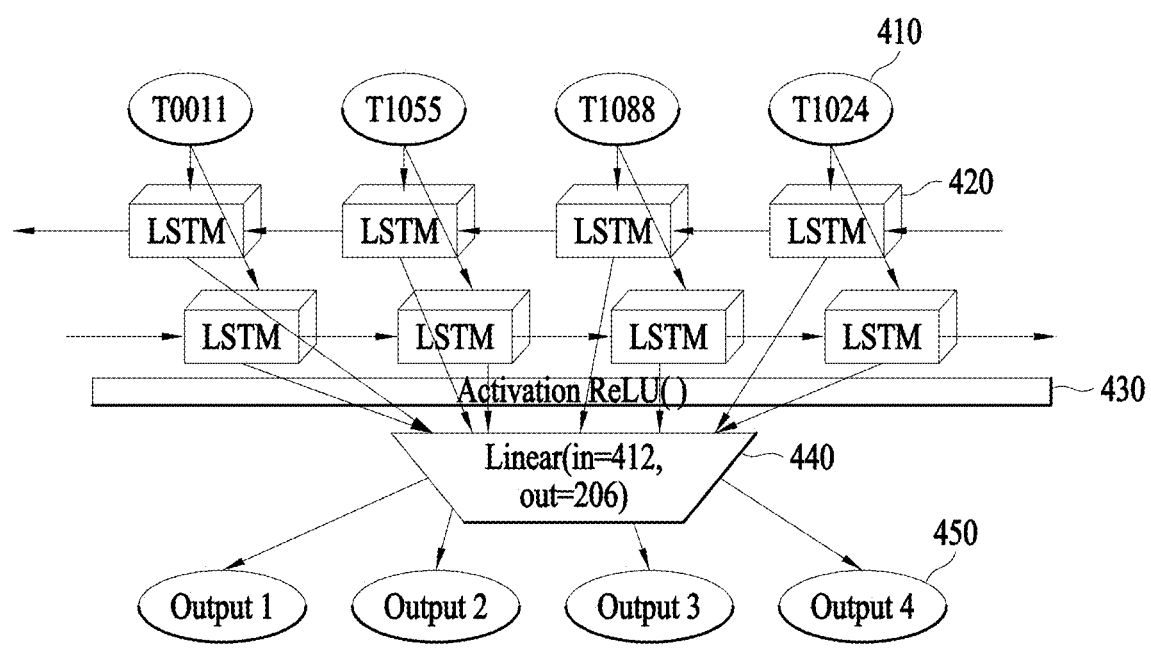
FIG. 4 is a diagram illustrating an attack prediction model according to an example embodiment.

FIG. 4 is a diagram illustrating an attack prediction model according to an example embodiment. FIG. 4 shows the flowchart of FIG. 3 in more detail.

According to the example embodiment, each of training data 410 is input to a bidirectional LSTM 420 and is input to a linear layer 440 through a ReLU function 430, which is an activation function. Further, the linear layer 440 may output a technique pattern 450 that can predict a precedence relationship between techniques.

Figure 5:
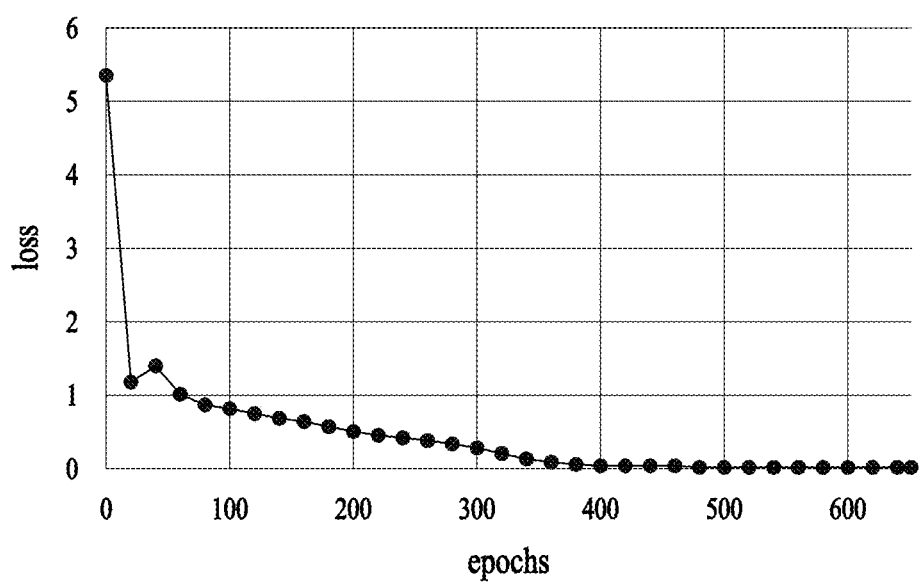
FIG. 5 is a graph showing training loss according to an example embodiment.

FIG. 5 is a graph showing training loss according to an example embodiment.

FIG. 5 illustrates a change in loss values according to the number of trainings, epochs. The dataset in Table 1 is referred to as data for training, and data on cyberattacks that occurred in the year of 2021 were used as data for testing. Further, num_layers=2, bidirectional=True, dropout=0.2 are used as parameters of the LSTM cell, Adam is used as the optimizer and the learning rate is configured to be 0.01. Regarding the loss in the graph, cross entropy, which represents the difference between a predicted value and an experimental value, is used, and it is configured that the training is stopped when the loss value is less than 0.003. Meanwhile, experimental results may differ slightly from experiment to experiment due to the random seed.

Referring to FIG. 5, the loss value is 0.002965 when training is performed 653 times, and the hamming loss at this time is 0.13. Specifically, when the test was conducted on the cyberattack data of 2021 with the attack prediction model of the present disclosure, it showed the accuracy of 87%.

Figure 6:
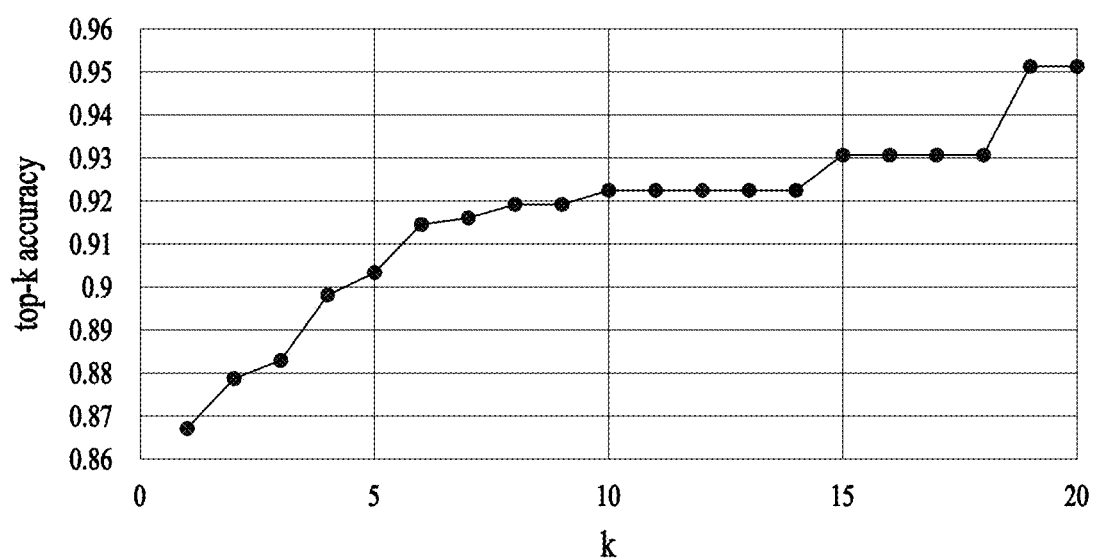
FIG. 6 is a graph showing top-k accuracy according to an example embodiment.

FIG. 6 is a graph showing top-k accuracy according to an example embodiment.

FIG. 6 illustrates top-k accuracy according to k for prediction of the next technique of the attack prediction model of the present disclosure. As a result of the experiment, the generally accepted top-5 accuracy was 90%. In other words, the prediction accuracy of the attack prediction model of the present disclosure is high.

Figure 7:
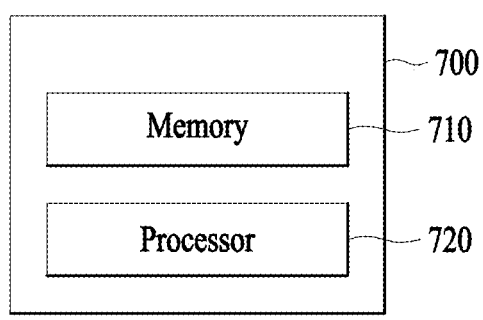
FIG. 7 is a diagram illustrating a device for training an attack prediction model according to an example embodiment.

FIG. 7 is a diagram illustrating a device for training an attack prediction model according to an example embodiment.

A device for training (e.g., configuring) an attack prediction model 700 of the present disclosure may include a memory 710 and a processor 720 according to the example embodiment. Since the elements illustrated in FIG. 7 are not essential to implement the device, those skilled in the art will understand that the device for training the attack prediction model 700 described herein may have more or less elements than the elements listed above. Meanwhile, in an example embodiment, the processor 720 may be at least one processor.

According to an example embodiment, the memory 710 may store an attack dataset including at least one attack datum. Further, the memory 710 may store the context of the technique output from the attack prediction model.

According to an example embodiment, the processor 720 may analyze the attack dataset based on the tactics and the techniques, and generate a sequence for at least one attack datum based on the analysis. Further, the processor 720 may train the attack prediction model based on the sequence.

The above description is merely illustrative of the technical idea of the present disclosure, and various modifications and variations will be possible without departing from the essential quality of the present disclosure by those of ordinary skill in the art to which the present disclosure belongs. Therefore, the example embodiments in the present disclosure are intended to explain, not to limit the technical spirit of the present disclosure, and the scope of the technical spirit of the present disclosure is not limited to the example embodiments. The scope to be protected of the present disclosure should be construed by the following claims, and all technical ideas within the scope of the claims and equivalents should be construed as being included in the scope of the present disclosure.

What is claimed is:

1. A method for training an attack prediction model performed by a device comprising a memory and a processor, comprising:

obtaining, by the processor and via the memory, an attack dataset including at least one attack datum;

analyzing, by the processor, the attack dataset based on tactics and techniques;

generating, by the processor, a sequence for the at least one attack datum based on the analysis;

training, by the processor, the attack prediction model based on the sequence wherein the attack prediction model is a long short term memory (LSTM) recurrent neural network (RNN) that includes LSTM layers and utilizes rectifier linear unit (ReLU) activation after prediction through the LSTM layers;

inputting, by the processor, an attack dataset regarding an attack into the trained attack prediction model;

obtaining, by the processor, a next technique of the attack predicted from the trained attack prediction model; and identifying, by the processor, a defense corresponding to the attack based on the next technique, wherein the generating a sequence includes:

allocating, by the processor, the tactics to the techniques;

sorting, by the processor, the at least one attack datum based on an order of the tactics; and generating, by the processor, a sequence for the techniques based on the sorted attack datum.

2. The method of claim 1, wherein each of the tactics is one of a process of a cyberattack, and each of the techniques is for performing the tactics.

3. The method of claim 1, the attack dataset is data obtained by one-hot encoding of a cyberattack based on the tactics and the techniques, and each of the at least one attack datum corresponds to one of the tactics and the techniques.

4. The method of claim 1, wherein the at least one attack datum is sorted based on the order of the tactics using a sorting algorithm.

5. The method of claim 1, wherein the training, by the processor, the attack prediction model, comprising:

constituting, by the processor, training data including a first technique of the sequence to a technique that is second to a last technique in the sequence;

constituting, by the processor, a training label including from a second technique from a beginning of the sequence to the last technique; and training, by the processor, the attack prediction model by pairing each of the training data and each of the training label.

6. The method of claim 1, wherein the LSTM is designed to be bidirectional.

7. A device for training an attack prediction model, comprising:

a processor; and a memory storing a program including instructions, wherein the instructions, when executed, cause the processor to:

obtain, via the memory, an attack dataset including at least one attack datum;

analyze the attack dataset based on tactics and techniques;

generate a sequence for the at least one attack datum based on the analysis;

train the attack prediction model based on the sequence, wherein the attack prediction model is a long short term memory (LSTM) recurrent neural network (RNN) that includes LSTM layers and utilizes rectifier linear unit (ReLU) activation after prediction through the LSTM layers;

input an attack dataset regarding an attack into the trained attack prediction model;

obtain a next technique of the attack predicted from the trained attack prediction model; and identify a defense corresponding to the attack based on the next technique, wherein the processor generates the sequence by:

allocating the tactics to the techniques;

sorting the at least one attack datum based on an order of the tactics; and generating a sequence for the techniques based on the sorted attack datum.

8. The device of claim 7, wherein each of the tactics is one of a process of a cyberattack, and each of the techniques is for performing the tactics.

9. The device of claim 7, the attack dataset is data obtained by one-hot encoding of a cyberattack based on the tactics and the techniques, and each of the at least one attack datum corresponds to one of the tactics and the techniques.

10. The device of claim 7, wherein the at least one attack datum is sorted based on the order of the tactics using a sorting algorithm.

11. The device of claim 7, wherein the processor trains the attack prediction model, by:

constituting training data including a first technique of the sequence to a technique that is second to a last technique in the sequence;

constituting a training label including from a second technique from a beginning of the sequence to the last technique; and training the attack prediction model by pairing each of the training data and each of the training label.

12. The device of claim 7, wherein the LSTM is designed to be bidirectional.

13. A non-transitory computer readable storage medium storing a program for training an attack prediction model configured to be executed by a processor, the program comprising instructions for:

obtaining, by the processor, an attack dataset including at least one attack datum;

analyzing, by the processor, the attack dataset based on tactics and techniques;

generating, by the processor, a sequence for the at least one attack datum based on the analysis;

training, by the processor, the attack prediction model based on the sequence, wherein the attack prediction model is a long short term memory (LSTM) recurrent neural network (RNN) that includes LSTM layers and utilizes rectifier linear unit (ReLU) activation after prediction through the LSTM layers;

inputting, by the processor, an attack dataset regarding an attack into the trained attack prediction model;

obtaining, by the processor, a next technique of the attack predicted from the trained attack prediction model; and identifying, by the processor, a defense corresponding to the attack based on the next technique, wherein the generating a sequence includes:

allocating, by the processor, the tactics to the techniques;

sorting, by the processor, the at least one attack datum based on an order of the tactics; and generating, by the processor, a sequence for the techniques based on the sorted attack datum.

* * * * *